A. B. POND.
POULTRY ROOST.
APPLICATION FILED NOV. 16, 1910.
1,047,697.
Patented Dec. 17, 1912.
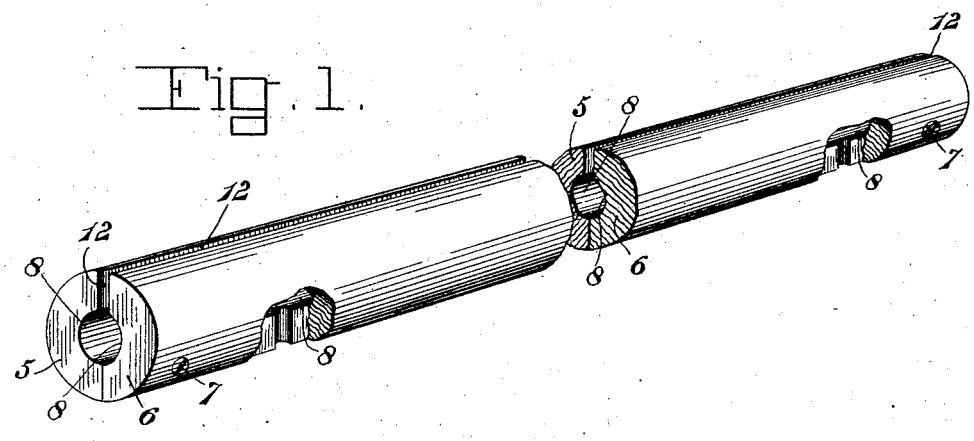
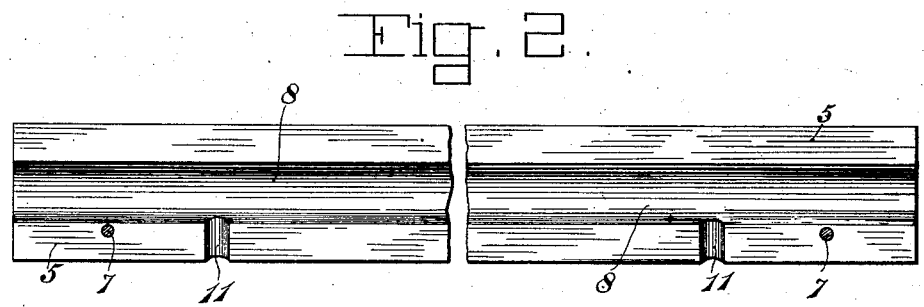
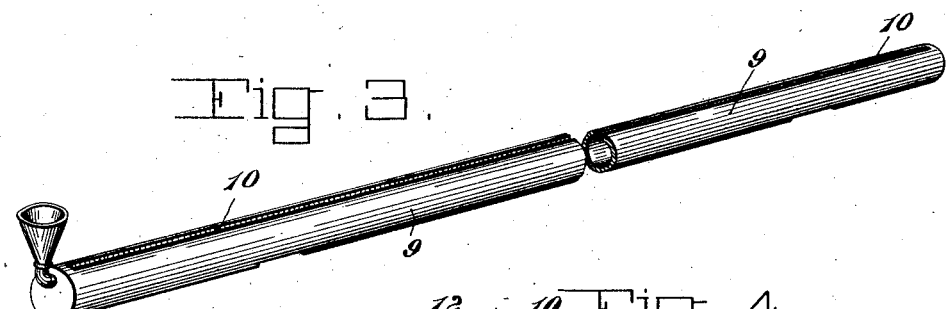
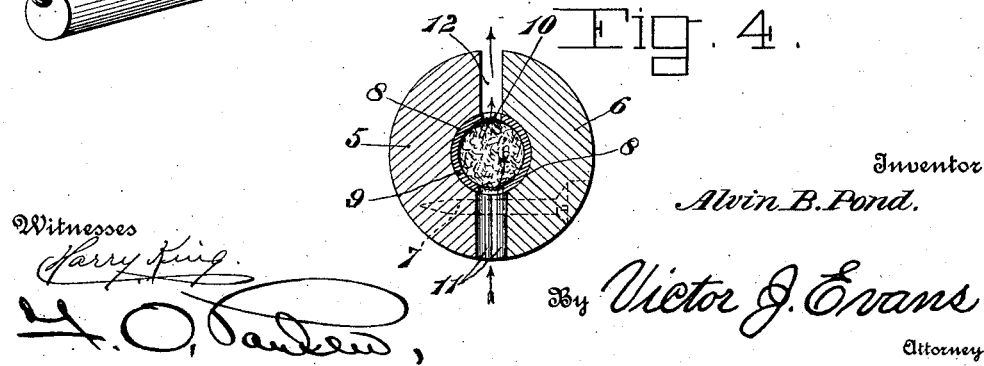
Inventor
Alvin B. Pond.
Witnesses
Harry King
H. O. Parker
By Victor J. Evans
Attorney
COLUMBIA PLANOGRAPH CO., WASHINGTON, D. C.

UNITED STATES PATENT OFFICE.

ALVIN B. POND, OF ENID, OKLAHOMA.

POULTRY-ROOST.

1,047,697.

Specification of Letters Patent. Patented Dec. 17, 1912.

Application filed November 16, 1910. Serial No. 592,686.

*To all whom it may concern:*

Be it known that I, ALVIN B. POND, a citizen of the United States, residing at Enid, in the county of Garfield and State of Oklahoma, have invented new and useful Improvements in Poultry-Roosts, of which the following is a specification.

The invention relates to a poultry or chicken roost, and more particularly to the class of medicated or fumigating chicken roosts.

The primary object of the invention is the provision of a roost in which poisonous or fumigating substances may be held for destroying insects and vermin thereby assuring sanitary conditions within a hen-house or the like.

Another object of the invention is the provision of a chicken roost of this character in which the chickens or other fowls perched thereon will be protected from insects, lice or other vermin, the roosts being readily and easily knocked-down for cleaning purposes for maintaining the same sanitary.

A further object of the invention is to provide a fumigator which may be used as a roost or as a rest in nests for destroying vermin, and also that will prevent the feet of the fowl perched thereon coming in contact with the poisonous or fumigating substances, thus obviating injury to the fowl.

A still further object of the invention is the provision of a roost of this character which is simple in construction, thoroughly reliable and efficient in operation and inexpensive in manufacture.

With these and other objects in view, the invention consists in the construction, combination and arrangement of parts as will be more fully hereinafter described, illustrated in the accompanying drawings, and pointed out in the appended claim.

In the drawings:—Figure 1 is a perspective view of a roost constructed in accordance with the invention. Fig. 2 is a side elevation of one of the sections thereof, looking toward the inner face of the same. Fig. 3 is a perspective view of the receiver detached from the roost. Fig. 4 is a vertical transverse sectional view through the roost.

Similar reference characters are employed to designate corresponding parts throughout the several views of the drawings.

Referring to the drawings by numerals, the roost comprises complementary separable sections 5 and 6, each being preferably constructed from wood, although the same may be made from any other suitable material, and both sections are suitably fastened or secured together by means of detachable screw or bolt members 7, thereby enabling one section to be detached from the other for cleaning purposes. These sections 5 and 6 are provided in their inner abutting faces with semi-circular shaped registering grooves or channels 8 forming a bearing seat for detachably receiving a tubular receiver 9, the same being coextensive with the sections and is adapted to contain any suitable poisonous or fumigating substance, the wall of the receiver 9 being provided with a slot 10 to permit the escape of the fumes from the poisonous or fumigating substances held therein.

Opening through the bottom of the perch and formed in the inner contiguous walls of the sections 5 and 6 are vertical air vents 11, the same intersecting the registering channels or grooves 8 in the said sections, and alining the apertures in the wall of the tubular receiver 9, thus permitting a supply of air to the interior of the perch.

Formed in the top of the roost is a longitudinally disposed slot 12, each section of the said roost being cutaway at one end of the channel 8 therein to provide the said slot 12, and through this latter escapes the poisonous or fumigating substances from the receiver 9 so as to contact with the bodies of the fowls resting upon the roost and thoroughly permeate the feathers thereof destroying any parasite which may be on the fowl and ridding them of such undesirable pest. The receiver 9 for poisonous compositions may be filled with the said compositions in any desirable manner, also this receiver may be constructed of any suitable material desirable for the purpose intended.

Of course, it is to be understood that the vent 11 in the roost may be entirely omitted, if desired. Furthermore, it is to be pointed out that this device may be utilized as a fumigator for destroying all kinds of insects or vermin as is contemplated. It may be hung in a cupboard or suspended from the side rail of a bed, so that vermin or insects of all species may be attracted by the poisonous substance contained in the device, whereby they will be destroyed either from direct contact therewith, or the fumes issuing therefrom. Therefore, it is to be clearly understood that the device is not limited to the use hereinbefore described, but may be utilized wherever needed and for the purposes mentioned.

Having thus described the invention what is claimed as new is:—

A device of the class described comprising a tubular section providing a bore longitudinally therethrough, the said tubular section being provided with an opening in the top thereof, and communicating with the bore, and also further provided with passages opening through the bottom thereof, a tubular core inserted within the bore in said tubular section, said core provided with apertures alining with the passages in the said tubular section, and poisonous substances filling the said core.

In testimony whereof I affix my signature in presence of two witnesses.

ALVIN B. POND.

Witnesses:
J. B. HORNEY,
H. N. YERKES.

Copies of this patent may be obtained for five cents each, by addressing the "Commissioner of Patents, Washington, D. C."